United States Patent [19]

Fearon et al.

[11] Patent Number: 4,522,284

[45] Date of Patent: Jun. 11, 1985

[54] COMPOSITE PANEL STRUCTURE

[75] Inventors: William W. Fearon, Worthington; Arnel M. Macy, Columbus, both of Ohio

[73] Assignee: Peabody Noise Control, Inc., Dublin, Ohio

[21] Appl. No.: 486,944

[22] Filed: Apr. 20, 1983

[51] Int. Cl.³ .............................................. E04B 1/82
[52] U.S. Cl. ..................................... 181/292; 181/286; 181/294; 428/116; 156/290
[58] Field of Search ............... 181/284, 285, 286, 287, 181/288, 290, 291, 289, 295, 296, 292; 52/144, 145, 806, 807, 808; 428/116, 117, 118; 156/306.6, 309.6, 290, 295, 197, 325

[56] References Cited

U.S. PATENT DOCUMENTS

| | | |
|---|---|---|
| 1,172,710 | 2/1916 | Howe . |
| 2,113,128 | 4/1938 | Cunnington ..................... 181/290 X |
| 3,021,916 | 2/1962 | Kemp . |
| 3,095,943 | 7/1963 | Kemp . |
| 3,166,149 | 1/1965 | Hulse et al. ....................... 428/118 X |
| 3,249,659 | 5/1966 | Voelker .......................... 428/117 X |
| 3,380,206 | 4/1968 | Barnett ................................ 52/145 |
| 3,831,710 | 8/1974 | Wirt .............................. 181/292 X |
| 3,913,702 | 10/1975 | Wirt et al. ...................... 181/33 G |
| 3,934,382 | 1/1976 | Gartung . |
| 3,948,346 | 4/1976 | Schindler ........................ 181/292 X |
| 4,021,983 | 5/1977 | Kirk, Jr. . |
| 4,084,367 | 4/1978 | Saylor et al. . |
| 4,155,211 | 5/1979 | Saylor et al. . |
| 4,167,598 | 9/1979 | Logan et al. . |
| 4,213,516 | 7/1980 | Sulewsky ........................ 181/292 X |
| 4,265,955 | 5/1981 | Harp et al. ........................... 428/116 |
| 4,269,882 | 5/1981 | Carrillo et al. . |
| 4,275,801 | 6/1981 | Bschorr ............................... 181/290 |
| 4,294,329 | 10/1981 | Rose et al. .......................... 181/222 |
| 4,300,978 | 11/1981 | Whitemore et al. ............ 181/292 X |
| 4,301,890 | 11/1981 | Zalas .................................. 181/286 |
| 4,318,453 | 3/1982 | Rose et al. . |
| 4,353,947 | 10/1982 | Northcutt ........................... 428/116 |

FOREIGN PATENT DOCUMENTS 2150511  4/1973  France ................................. 428/116

Primary Examiner—L. T. Hix
Assistant Examiner—Brian W. Brown
Attorney, Agent, or Firm—St. Onge Steward Johnston & Reens

[57] ABSTRACT

A panel having a cellular core and an acoustically semi-transparent facing is provided. The core, which may be a honeycomb, has cells opening to a face of the core. The facing is bonded to the face of the core such that pillow-like portions of the facing extend into the open cells of the core to provide a mechanical interlock between the facing and the core and to improve the absorption of acoustic energy directed upon the panel. The panel may include a layer bonded to the core opposite the facing for reducing the transmission of acoustic energy through the panel or for increasing its strength and rigidity. Preferably, the facing is non-homogeneous such that the density of the pillow-like portions is less than the portions of the facing adjacent the structure of the core. The panel may be formed by heating and compressing an uncured fibrous element of relatively uniform thickness and density against a cellular core. A heated platen may be used to produce a relatively flat, hardened outer surface of the panel.

8 Claims, 6 Drawing Figures

U.S. Patent     Jun. 11, 1985     4,522,284
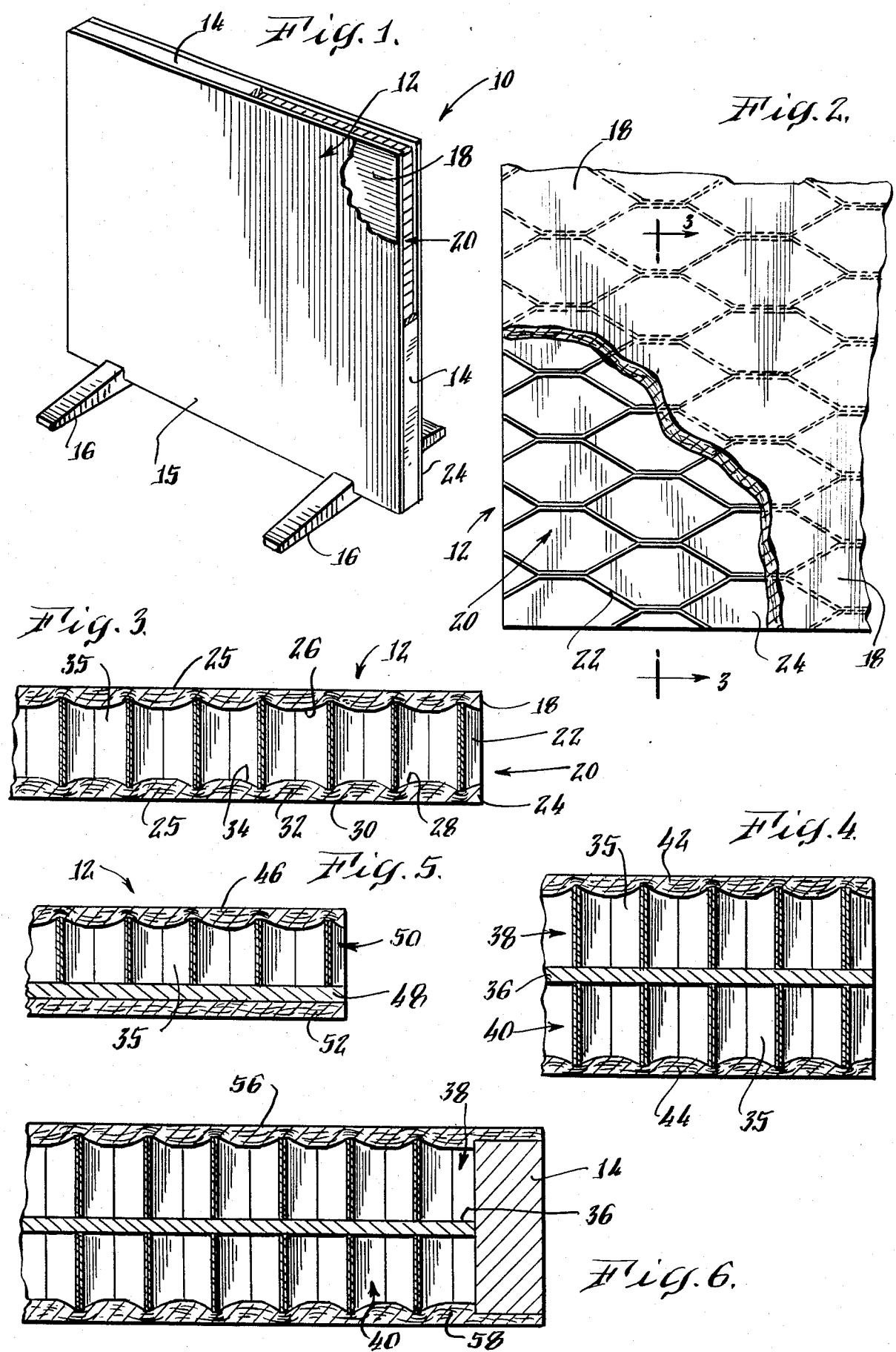

COMPOSITE PANEL STRUCTURE

BACKGROUND OF THE INVENTION

This invention relates to acoustical structures generally and, more particularly, to a strong, lightweight composite panel capable of absorbing sound so as to reduce sound reflected from or transmitted through the panel.

Various space dividers of prefabricated composite panels are commonly used in commercial buildings for dividing an interior space into work areas. Such space dividers may include a frame for reinforcing the panels and a stand or legs for supporting the panels in a vertical plane. These space dividers have proven effective in providing privacy within a building while improving the interior appearance of the work space. The composite panels used in such space dividers may be provided with soft exterior finishes to absorb sound, for example, by covering with carpeting or fabric, or may be provided with a decorative covering material to improve their appearance.

Similar prefabricated composite panels are commonly used as ceiling tiles, wall panels, bulletin boards, partitions or enclosures, and other building elements. Each of these applications has particular requirements favoring a somewhat different acoustical structure. For example, structural rigidity, strength, fire resistance, thermal insulating ability, impact resistance, and smoothness or tackability of the surface may be required in addition to the ability to reduce transmitted or reflected sound. Mounting requirements may create particular problems.

Various structures have been proposed to provide a prefabricated panel capable of absorbing a high percentage of incident sound, i.e., sound directed normal to the panel or at other angles of incidence. One approach has been to provide a homogeneous fiberglass core reinforced by a rectangular perimeter frame and having a fabric covering. However, such panels do not possess sufficient strength and rigidity for many applications. Other panel designs have utilized a laminated honeycomb structure to reinforce a sound deadening material to provide a lightweight semi-rigid panel, such as that proposed in U.S. Pat. No. 3,021,916.

Such panels having a honeycomb core are normally laminated or faced by a hot press or cold press method. In each case, an adhesive is applied to the facing and/or to the honeycomb core before the laminations of the panels are stacked and exposed to pressure while the adhesive cures. A hot press is used if the adhesive must be cured at high temperatures. In some cases, the core is crimped to provide a glue shelf for the application of the adhesive. However, the adhesives of such panels inhibit the sound absorbing qualities of the panels and do not provide adequate resistance to delamination in shear when the panels are subjected to bending.

Another proposed panel construction is an assembly of separate layers of homogeneous fiberglass of different densities. For example, such a panel might have a fabric covering, a ⅛ inch layer of compressed fiberglass board, a ¾ inch layer of low density fiberglass, a 20 gauge metal pan, a second ¾ inch layer of low density fiberglass, a second ⅛ inch layer of compressed fiberglass board, and a second fabric covering. This type of panel construction is expensive, particularly because the pan must be made of metal to provide the necessary strength and because the finished panel must be assembled of separate layers instead of by insertion of a prefabricated panel board.

It has also been proposed that a honeycomb core be used on opposite sides of a septum or divider, as disclosed in U.S. Pat. No. 4,084,367. The panel structure proposed therein includes apertured sheetmetal skins providing a single, small opening to each cell of the honeycomb core to form Helmholtz resonators for trapping sound energy. However, the sheetmetal skins forming the exterior walls of the Helmholtz resonators reflect a large percentage of the incident sound back into the working area. Furthermore, each of the Helmholtz resonators can only be tuned to absorb a single sound frequency corresponding to the volume of the cell.

A need exists for an improved composite panel structure suitable for use in space dividers, ceiling tiles, wall panels, blackboards or bulletin boards, partitions or enclosures, and other building elements. In addition to enhanced acoustical properties, the structure should provide appropriate structural rigidity, strength, fire resistance, thermal insulating ability and surface texture for each application. The structure should provide improved resistance to delamination in shear and should be suitable for low cost manufacture as a prefabricated panel in various thicknesses and configurations.

It is therefore an object of the present invention to provide a low cost composite panel structure having strength and rigidity and providing improved absorption of sound energy over that which can be obtained with a comparable thickness of homogeneous absorption material. It is a further object of the present invention to provide such a structure having improved absorption capability on one or both sides of a panel in combination with an acoustical barrier to prevent the transmission of sound through the panel. It is a further object of the present invention to provide such a structure with an impact resistant or tackable surface and with various core configurations which may include a molded-in frame.

SUMMARY OF THE INVENTION

The present invention is directed to a novel composite panel structure suitable for absorbing incident acoustic energy and to a method of manufacturing the composite panel structure.

According to one aspect of this invention, a acoustical structure having a core and a facing is provided. The core has structure means forming cells which are open to one face of the core. The facing is of acoustically fibrous semi-transparent material bonded to the structure means at the face of the core. Portions of the facing extend into the adjacent open cells of the core to provide a mechanical interlock between the facing and the core. The extending portions of the facing partially fill the cells of the core and improve the absorption of acoustic energy directed upon the composite panel structure.

The composite panel structure may include a layer bonded to the core opposite the face to which the facing is bonded for reducing the transmission of acoustic energy through the structure or for increasing the strength and rigidity of the structure. The structure means of the core may be a honeycomb. Preferably, the facing is non-homogeneous such that the density is greater adjacent the structure means forming the cells than in the portions extending into the cells. The facing may have a quilt-like configuration with convex pillow-like portions extending into the cells. Various embodiments of the acoustical structure may include a second facing on a second face of the core or a septum and a second core.

According to a second aspect of the invention, a method of making a composite panel structure is provided. An uncured fibrous element including a binder and having a relatively uniform thickness and density is positioned against a core having a structure defining open cells. The fibrous element is then compressed against the core such that a surface of the fibrous element enters the cells of the core and such that the thickness of the fibrous element is reduced adjacent the structure defining the cells. The surface of the compressed fibrous element opposite the core is then subjected to sufficient heat to cure the binder and harden the surface. Preferably, the fibrous element is formed into a pillow-like configuration having a curved portion entering the cells of the core and a relatively flat surface opposite the core.

The invention, together with further objects and attendant advantages, will be best understood by reference to the following detailed description of the preferred embodiments taken in conjunction with the accompanying drawings.

BRIEF DESCRIPTION OF THE DRAWINGS

FIG. 1 is a perspective view of a space divider made in accordance with the present invention, with portions broken away;

FIG. 2 is a front view, in elevation, of a portion of the composite panel of the space divider of FIG. 1, with a portion of the facing broken away;

FIG. 3 is a sectional view of the panel of FIG. 2 taken along the line 3—3;

FIG. 4 is a sectional view of the panel of FIG. 2 similar to FIG. 3 but showing a second embodiment;

FIG. 5 is a sectional view of the panel of FIG. 2 showing a third embodiment; and FIG. 6 is a sectional view of the panel of FIG. 2 showing a fourth embodiment.

DETAILED DESCRIPTION OF THE PREFERRED EMBODIMENTS

Turning now to the drawings, FIG. 1 shows a space divider, indicated generally by the numeral 10, made in accordance with this invention. The space divider 10 includes a composite panel, indicated generally by the numeral 12, having an optional perimeter frame member 14 for reinforcement and a covering 15 primarily for decoration. A stand 16 is provided to support the panel 12 in a substantially vertical plane. Although other configurations may be used with similar effect, the stand 16 may be conveniently formed as four horizontal legs, as shown.

The structure of the composite panel 12 includes a first facing 18 of acoustically semi-transparent material, preferably a fibrous material such as fiberglass, formed as a blanket or mat. The facing 18 is bonded directly over a cellular core 20, as shown in FIGS. 2 and 3. Preferably, the cellular core 20 is a walled structure such as a honeycomb formed of cardboard, paper, aluminum, or similar material. In the preferred embodiments shown, expandable hexagonal cells having walls 22 of kraft paper comprise the cellular core 20. As shown in FIG. 3, a second facing 24 of acoustically semi-transparent material is bonded directly over the cellular core 20 to form the back of the panel 12.

The facings 18 and 24 are essentially planar along their outer surfaces 25 but extend inward as convex pillows 26 so as to partially fill the cells of the core 20. The facings 18 and 24, initially formed as an uncured blanket of relatively uniform thickness and density, are formed during the manufacture of the composite panel 12 into a quilt-like configuration, as shown. As discussed in further detail below, the facings 18 and 24 form valleys or channels 28 for receiving the walls 22 and corresponding thin portions 30 between the walls 22 and the outer surfaces 25. Less dense, acoustically semi-transparent portions 32 remain between the channels 28, and soft inner surfaces 34 extend into the cells formed by the walls 22.

Unlike the laminated panels previously known, the composite panel 12 is fabricated with no adhesive between the facings and the honeycomb core. Instead, the facings 18 and 24 are provided with a binder to bond the facings to the core 20 and to bind the facings into the quilt-like configuration. The facings 18 and 24 and the core 20 are assembled in a stacked relationship and are placed in a hot platen press with the platens at a predetermined elevated temperature appropriate for the particular binder used. The press is closed to a predetermined platen spacing which is normally approximately ⅛ inch greater than the thickness of the core 20. The structure is then molded for approximately 1–6 minutes, depending upon the binder used, the thickness of the facings 18 and 24, and the desired texture of the surfaces 25. During this time, the binder cures and bonds the facings 18 and 24 to the core.

More specifically, the binder is cured adjacent the walls 22 of the honeycomb causing the facings to bond to the walls at the thin portions 30. The edges of the honeycomb compress the facings 18 and 24 adjacent the walls 22 to a thickness of approximately 1/16 inch, but allow the facings to expand between the walls 22 to a thickness of approximately ¼ inch, depending on the initial thickness of the material used for the facings and the spacing of the walls 22. The corresponding densities of the cured facings may vary by a factor of three or more; a larger honeycomb structure would allow a greater difference in thickness and density. The outer surfaces 25 which come in contact with the platens of the molding press become somewhat hard although acoustically semi-transparent due to curing of the binder, but the inner surfaces 34 remain soft and fluffy.

The channels 28, the convex pillows 26, and the walls 22 provide a mechanical interlock between the honeycomb of the core 20 and the facings 18 and 24. This interlock enhances the shear strength of the composite panel 12 and permits the panel to be bent and repeatedly flexed without the delamination problems incurred with conventional panels having a honeycomb core. The hardened outer surfaces 25 provide a smooth, impact resistant, acoustically porous surface which is well suited to the attachment of decorative covering 15, and can be used with tacks, pins or staples as a bulletin board. The hardening of the surfaces 25 also enhances the rigidity and strength of the composite panel 12, thereby eliminating or reducing the need for the frame member 14.

Because of its construction, particularly the varied densities and shapes of the facings 18 and 24, the composite panel 12 will absorb a significant amount of incident sound energy and will prevent reflection of the sound energy back toward the source. Only a small percentage of incident sound waves are reflected; the balance of the acoustic energy enters the interstices of the facing material and is dissipated by friction between the moving sound waves and the fixed fibers of the facing material. As the partially dissipated sound waves exit the fluffy inner surfaces 34 of the first facing 18, they may be reflected off the walls 22 of the honeycomb or may impinge directly on the second facing 24. Additional dissipation of sound energy occurs as the sound waves enter the fluffy inner surfaces 34.

In addition to the sound absorption of the facings 18 and 24, as described above, air spaces 35 within the cells of the core 20 absorb sound. The core thickness and spacing of the walls 22 may be varied to permit tuning of the acoustical structure to a particular absorption frequency range. Generally, an increase in the volume of the cells results in a lower tuned absorption frequency. As a result of the combined sound absorption of the facings 18 and 24 and the entrapped air spaces 35 of the core 22, the composite panel 12 exhibits better sound absorption over a broader frequency range than homogeneous fiberglass of a comparable thickness. Furthermore, the composite panel 12 exhibits better sound absorption than a corresponding honeycomb core layup having fiberglass facings of relatively uniform thickness bonded to the core by conventional methods.

The thermal properties of the composite panel 12 permit it to be used where a thermal insulating structure is required. Because the facings 18 and 24 are normally made of fiberglass, the composite panel 12 has excellent resistance to the transmission of heat. In addition, the entrapped air spaces 35 of the honeycomb core enhance the ability of the panel to serve as a thermal barrier. The honeycomb structure of the core 20 may be formed of a fire resistant material or, if formed of paper or similar material, may be treated with a flame retardant chemical.

Preferably, the facings 18 and 24 are formed of uncured fiberglass mat or blanket having fibers with a diameter of 0.0001 to 0.0005 inches. Such fibrous material is supplied, for example, by Owens-Corning Fiberglas Corporation of Toledo, Ohio or Knauff Fiber Glass GmbH of Shelbyville, Ind. The binder, supplied as a component of the mat or blanket, is a combination of urea- and phenolformaldehyde. The named sources designate this mat or blanket material as Fiberglas Molding Media or simply as uncured fiberglass. The density of such uncured mat or blanket is between 0.75 and 2 pounds per cubic foot, normally 1.50 pounds per cubic foot. The nominal thickness of the uncured mat or blanket is typically 1.0 inch. The density of the uncured first facing 18 may be the same or different from that of the uncured second facing 24, and the thickness may be the same or different, depending upon the application requirements.

The preferred structure of the core 20 is expanded honeycomb having symmetricl hexagonal cells of 99 pound kraft paper such as that available from Mid-States Container Corporation of DeGraff, Ohio. This honeycomb structure was a high strength to weight ratio and allows bending and stretching to form curves in the acoustic panel 12. The thickness of the core 20 may be from $\frac{1}{2}$ inch to 6 inches with a normal thickness of $\frac{7}{8}$ inch or $1\frac{7}{8}$ inches to provide a finished panel thickness of 1 or 2 inches. The diameter of each hexagonal cell is normally approximately $\frac{3}{4}$ inch but could be $\frac{1}{2}$ inch or less. Cells thicker than $\frac{3}{4}$ inch may be used but may result in unevenness of the surface of the facing. Although not normally required, the honeycomb may be supplied impregnated with phenolic resin for greater durability and resistance to moisture.

The preferred binder specified above has a curing temperature of 375 degrees Fahrenheit. Normally the platens of the platen press are set between 375 and 500 degrees Fahrenheit and exert a pressure of 0.5 to 1.0 tons per square foot during the forming operation. As a result, the density of the cured mat or blanket is between 2 and 22 pounds per cubic foot, and the nominal thickness of the cured mat is between $\frac{1}{8}$ and $\frac{3}{8}$ inch, typically $\frac{1}{8}$ inch.

Preferably, the panel 12 is used with the covering 15, primarily for decoration. Applicants have found that an acoustical screen fabric such as Guilford cloth FR701 style 2100 is particularly suitable in that it is effective in absorbing high frequency sound energy. Such fabric is 100 percent polyester with a weight of 16.5 ounces per square yard and is a fire retardant. This material is available from Guilford Industries of New York, N.Y. A plastic such as 0.010 inch Naugahyde or vinyl may also be used as the covering 15.

A second embodiment of the present invention is shown in FIG. 4, characterized by a septum 36 interposed between a first core and a second core, indicated generally by the numerals 38 and 40, respectively. The cores 38 and 40 and an overlying first facing 42 and second facing 44 are similar to the core 20 and facings 18 and 24 of the first embodiment described above. The septum 36 may be made of paper, cardboard, chipboard, hardboard, sheetmetal, aluminum or similar non-porous material. Preferably, the septum 36 is made of two layers of 0.050 inch kraft paper, conveniently supplied as two paper-backed honeycomb cores bonded back-to-back. Suitable alternative constructions are a single layer of paper, a single layer of 0.023 or 0.050 inch kraft paper, $\frac{1}{8}$ inch hardboard, and chipboard.

The non-porous septum 36 serves to decrease the amount of sound transmitted through the acoustical panel 12 and may also be used to increase the strength and rigidity of the panel. A small percentage of the acoustic energy incident upon the first facing 42 is reflected back toward the source; a greater percentage is accepted into the interstices of the facing. The acoustic energy exiting the first facing 42 is partially dissipated and enters the cells of the first core 38 where it is further dissipated and reflected back off the septum 36. As the acoustic energy re-enters the soft, fluffy inner surfaces of the first facing 42, additional energy is dissipated, and the resulting energy reflected back toward the souce is significantly reduced. Due to the symmetry of the panel configuration, acoustic energy incident upon the second facing 44 is dissipated similarly.

A third embodiment is shown in FIG. 5, characterized by a first facing 46 and an interlayer 48 interposed between a core, indicated generally by the numeral 50, and a second facing 52. The interlayer 48 may be made of a non-porous material similar to that of the septum 36 of the second embodiment so as to serve as a barrier to reduce the transmission acoustic energy through the panel 12. However, for many applications that do not require an acoustic barrier, the interlayer 48 may be a porous material, such as a loosely woven fabric, for increasing the strength and rigidity of the panel. Sound energy incident upon the second facing 52 is not absorbed as effectively as that incident upon the first facing 46 due to the absence of convex pillows 26 and entrapped air spaces 35 between the second facing 52 and the interlayer 48.

It will be apparent that for many applications the second facing 52 of the third embodiment may not be required. For example, when the panel 12 is used as a wall hanging or as a ceiling tile, the sound energy is directed against only one side of the panel 12 and the second facing 52 is unnecessary. In such applications, the interlayer 48 serves as a structural member adding strength and rigidity to the wall hanging or ceiling tile and may also serve to reduce the transmission of sound to an adjoining room or floor, respectively, particularly if the interlayer 48 is made of a non-porous material.

FIG. 6 shows a fourth embodiment similar to the second embodiment of FIG. 4 but having a frame member 14 molded into the acoustical panel 12. The frame member 14 is placed at the edge of the core 20, and the binder of the overlaying facings 56 and 58 bonds the frame member 14 to the facings during the molding process. Preferably, the frame member 14 is made of a suitable hardwood, but it can also be made of cardboard, plastic, metal, or other rigid material. The frame member 14 increases the structural strength of the panel 12, provides a surface to facilitate mounting of the covering 15, and may eliminate the need for an external perimeter frame such as that required with room dividers having conventional acoustical panels. In addition, the frame member 14 may be added solely to provide a more finished appearance to the panel 12.

The acoustical panel 12 may be flat or contoured to a desired curve. Preferably, overall sizes are 12 inches×18 inches to 60 inches×108 inches, the most typical sizes being 48 inches×60 inches and 60 inches by 60 inches. The cost of the acoustical panel 12 is less than that of conventional panels due to the elimination of numerous manufacturing steps and the substitution of less expensive materials. The panel may serve either as a highly absorptive structure (without the septum 36 or interlayer 48) or as a combination absorptive structure and barrier structure (with the septum 36 or interlayer 48).

From the foregoing, it should be apparent that the present invention provides an inexpensive, strong, lightweight composite panel structure having application as a panel material for a wide variety of walls, ceilings, partitions, and other building elements. The composite panel structure disclosed can withstand very high unit loadings in compression and bending and is dimensionally stable under a wide range of temperature and humidity conditions. The improved sound absorption of the composite panel structure may be provided on one or both sides of the structure in combination with an acoustical barrier. An impact resistant or tackable surface and various core configurations may also be provided. In addition, when formed with fiberglass facings and fire retardant core and coverings, as disclosed herein, the composite panel structure is an effective fire barrier.

Of course, it should be understood that various changes and modifications to the preferred embodiments described above will be apparent to those skilled in the art. For example, other cellular core configurations may be used, and other, non-planar facing surfaces may be formed. Such changes and modifications can be made without departing from the spirit and scope of the present invention, and it is therefore intended that such changes and modifications be covered by the following claims.

What is claimed is:

1. A composite panel structure having acoustical absorbing properties, comprising:
    a core having structure means forming cells open to at least one side of the core; and
    an acoustically semi-transparent facing of fibrous material and a binder formed to provide a relatively hard outer surface of partially bonded fibers with interstices therebetween, the facing being bonded to the structure means at said open side of the core and having portions extending into the adjacent open cells of the core to a depth sufficient to provide a mechanical interlock between the facing and the core to increase the strength of the structure in resisting shear forces adjacent the facing, said portions of the facing being relatively soft and partially filling the adjacent open cells of the core to enhance absorption of acoustic energy directed upon the facing.

2. The composite panel structure of claim 1 wherein the structure means of the core is a honeycomb dividing the core into a plurality of cells, the facing being bonded to the honeycomb by the same binder bonding the fibers together, the density of the facing adjacent the honeycomb being greater than the density of the facing portions extending into the cells of the core.

3. The composite panel structure of claim 2 wherein the facing has a substantially planar outer surface, the thickness of the facing being greater at the portions extending into the cells of the core than the thickness of the facing adjacent the honeycomb.

4. The composite panel structure of claim 1 further comprising a non-porous layer bonded to a side of the core substantially opposite the side to which the facing is bonded, the non-porous layer serving as a barrier to reduce the transmission of sound energy through the structure.

5. The composite panel structure of claim 1 wherein the portion of the facing extending into the cells of the core is curved and the surface of the facing opposite the core is relatively flat.

6. A composite panel structure having acoustical absorbing properties, comprising:
    a core having wall means forming cells open to a first side and a second side thereof;
    an acoustically semi-transparent first facing of fibrous material and a binder formed to provide a relatively hard outer surface of partially bonded fibers with interstices therebetween, the first facing being bonded to said first side of the core; and
    an acoustically semi-transparent second facing of fibrous material and a binder formed to provide a relatively hard outer surface of partially bonded fibers with interstices therebetween, the second facing being bonded to said second side of the core, the facings having portions extending inwardly into the adjacent open cells of the core a depth sufficient to increase the strength of the structure in resisting shear forces adjacent the facings, the facings being non-homogeneous, said portions extending into the cells being of less density than the portions adjacent said cell wall means, the facings being relatively flat on the outwardly facing surfaces and curved on the inwardly facing surfaces.

7. A composite panel structure having acoustical absorbing properties, comprising:
    a first core having wall means forming cells;
    a second core having wall means forming cells;

a septum of non-porous material interposed between and bonded to the first and second cores such that the first and second cores have cells open to a first side and a second side, respectively, for service as a barrier to reduce the transmission of acoustic energy from one of the cores to the other;

an acoustically semi-transparent first facing of fibrous material and a binder formed to provide a relatively hard outer surface of partially bonded fibers with interstices therebetween, the facing being bonded to said first side; and an acoustically semi-transparent second facing of fibrous material and a binder formed to provide a relatively hard outer surface of partially bonded fibers with interstices therebetween, the facing being bonded to said second side, the first and second facings having portions extending inward into the adjacent open cells of the first and second cores to a depth sufficient to provide a mechanical interlock between the facings and the cores and to enhance absorption of acoustic energy, the facings having outwardly facing substantially parallel surfaces that are relatively flat and have inwardly facing surfaces that are curved.

8. A composite panel structure having acoustical absorbing properties, comprising:
   a honeycomb core having wall means forming cells having a polygonal cross-section, the cells being open to a side of the core; and
   a fibrous facing of acoustically semi-transparent material bonded to the wall means at the open side of the core so as to bind together the fibers and form a quilt-like facing having pillow-like portions partially filling the cells and having a curved surface at the portions partially filling the cells and a relatively flat surface opposite the honeycomb core, said facing being made of a fibrous material and a urea-phenol formaldehyde resin thermosetting binder formed under heat and pressure to provide an outer surface of partially bonded fibers with interstices therebetween.

* * * * *